United States Patent
Arthur et al.

(10) Patent No.: US 7,914,935 B2
(45) Date of Patent: Mar. 29, 2011

(54) METHOD FOR MANAGING FUEL CELL POWER INCREASES USING AIR FLOW FEEDBACK DELAY

(75) Inventors: David A. Arthur, Honeoye Falls, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1216 days.

(21) Appl. No.: 11/536,914

(22) Filed: Sep. 29, 2006

(65) Prior Publication Data

US 2008/0081225 A1 Apr. 3, 2008

(51) Int. Cl.
*H01M 8/04* (2006.01)

(52) U.S. Cl. ........ 429/428; 429/431; 429/434; 429/442; 429/446

(58) Field of Classification Search ........... 429/428–451
See application file for complete search history.

(56) References Cited

U.S. PATENT DOCUMENTS

| | | | | |
|---|---|---|---|---|
| 4,839,246 A | * | 6/1989 | Takabayashi | 429/430 |
| 5,780,981 A | * | 7/1998 | Sonntag et al. | 429/432 |
| 5,991,670 A | * | 11/1999 | Mufford et al. | 429/431 |
| 6,849,352 B2 | | 2/2005 | Formanski et al. | |
| 6,939,631 B2 | | 9/2005 | Formanski et al. | |
| 7,348,082 B2 | * | 3/2008 | Kolodziej | 429/431 |
| 2002/0022161 A1 | * | 2/2002 | Kurosaki et al. | 429/13 |

FOREIGN PATENT DOCUMENTS

JP 07211336 A * 8/1995

* cited by examiner

*Primary Examiner* — Dah-Wei D Yuan
*Assistant Examiner* — Edu E Enin-Okut
(74) *Attorney, Agent, or Firm* — Fraser Clemens Martin & Miller LLC; J. Douglas Miller

(57) ABSTRACT

A method for managing fuel cell power increases in a fuel cell system using an air flow feedback delay. The method comprises the steps of determining a required air mass flow rate at a predetermined point in the fuel cell system, determining an actual air mass flow at a predetermined point in the fuel cell system, calculating an air flow feedback delay as a function of the required air mass flow rate and the actual air mass flow, and delaying an external circuit from increasing current draw from the fuel cell stack by the magnitude of the air flow feedback delay.

11 Claims, 2 Drawing Sheets

METHOD FOR MANAGING FUEL CELL POWER INCREASES USING AIR FLOW FEEDBACK DELAY

FIELD OF THE INVENTION

This invention relates to a method of operation for a fuel cell system. More particularly, the invention is directed to managing power increases in a hydrogen fuel cell system using an air mass flow feedback delay.

BACKGROUND OF THE INVENTION

In most modern fuel cell systems, a compressor provides compressed air to the fuel cell stack. Having sufficient air for the fuel cell reaction is extremely important and is characterized as "Cathode Stoichiometry" wherein a higher value (e.g. 5) is typically needed at low current densities and a lower value (e.g. 1.8) is typical at high current densities. In such systems it is necessary to have a means for sensing the air mass flow rate leaving the compressor and entering the fuel cell stack, such as an air mass flow sensor.

A control system will typically take this flow information and change the speed of the compressor along with the position of a back pressure valve to achieve a desired air mass flow and gas pressure entering the fuel cell stack. The desired air mass flow and gas pressure are generally calculated using known factors such as the fuel cell stack current, number of cells in the fuel cell stack, and the desired cathode stoichiometry at that stack current.

In such fuel cell systems the control system typically allows an external circuit to draw current out of the fuel cell system immediately upon detection of the desired air mass flow rate by the air mass flow sensor. The volume and distance between the location where the air mass flow sensor is taking the measurement and the location where the air is required at the reaction site of the fuel cell stack are not taken into account. Therefore, the current is drawn out of the fuel cell stack before the desired air mass flow is actually present at the reaction site. The lack of air at the reaction site can cause the cathode stoichiometry at the reaction site to drop enormously, and lead to significant voltage drops in cells that are sensitive to low cathode stoichiometries. The lowered cell voltages can at least cause the power management circuit to limit power output and could reverse (i.e. negative voltage) causing massive degradation. The lack of air is particularly harmful on current draw up-transients. The prior art systems do not take into account the distance and volume between where the air mass flow meter is taking the measurement and where the air-$H_2$ reaction actually takes place.

It would be desirable to develop a method of managing fuel cell power increases which would account for the volume and distance between the air mass flow sensor and the reaction site insuring the required air mass flow rate had reached the reaction site before the current is drawn from the fuel cell stack.

SUMMARY OF THE INVENTION

According to the present invention, a method of managing fuel cell power increases which would account for the volume and distance between the air mass flow sensor and the reaction site insuring the required air mass flow rate had reached the reaction site before the current is drawn from the fuel cell stack, has surprisingly been discovered. This method ensures that throughout an up-transient, the cathode stoichiometric requirement is always met at the site of the reaction. By ensuring this, stack stability is improved by preventing any one cell that is cathode stoichiometrically sensitive from losing voltage as a result of not having sufficient air. A secondary, but equally important, effect is the prevention of cathode starvation that leads to accelerated voltage degradation.

In one embodiment, the method for managing fuel cell power increases using air flow feedback delay comprises the steps of determining gas flow effecting characteristics of the fuel cell system between the compressor and the cathode outlet; determining an air mass flow rate between the compressor and the cathode outlet; determining a gas pressure of the fuel cell system between the compressor and the cathode outlet; calculating the air flow feedback delay as a function of said gas flow effecting characteristics, said air mass flow rate, and said gas pressure; and delaying the external circuit from drawing current out of the fuel cell stack by the magnitude of the air flow feedback delay.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
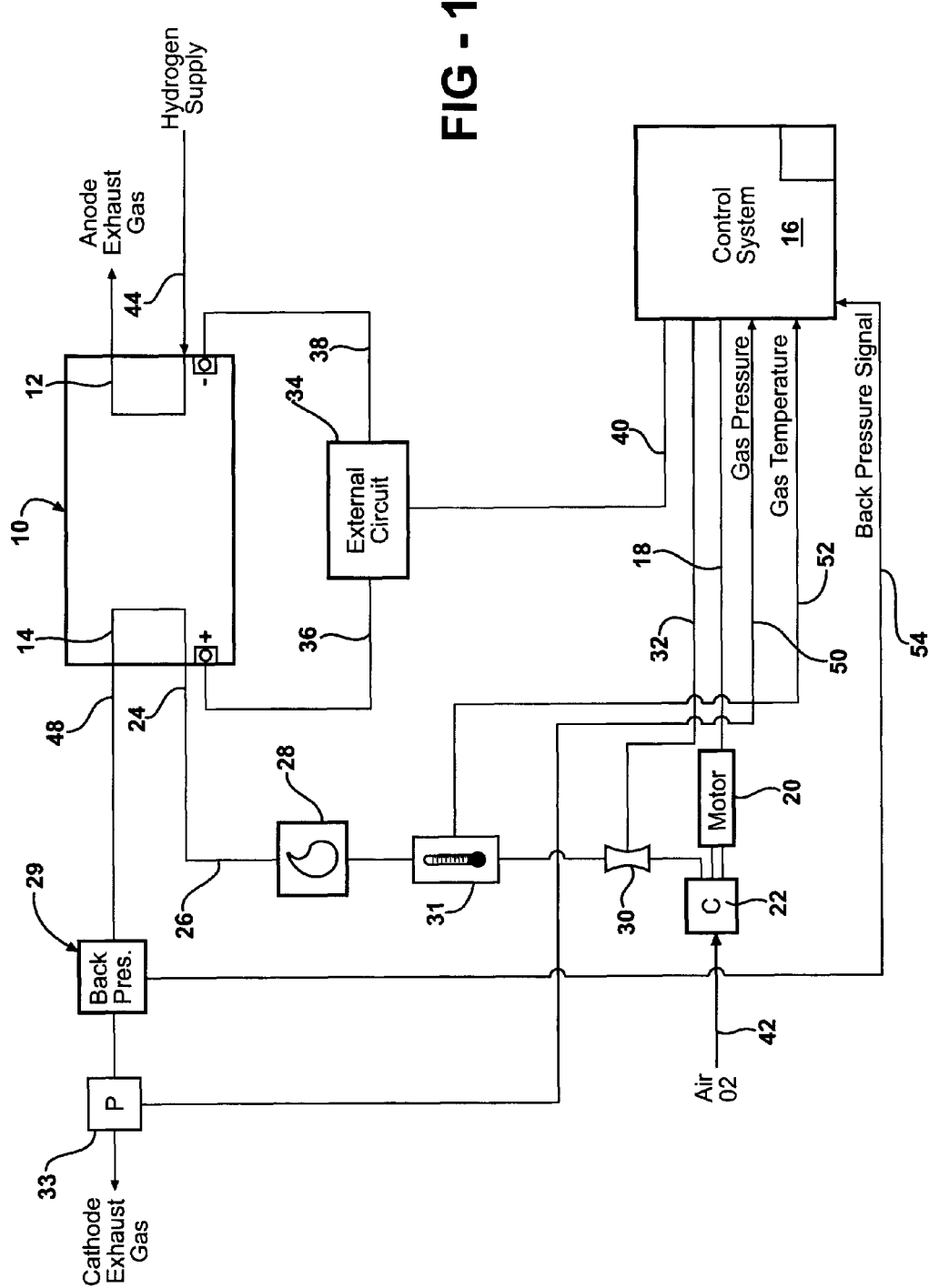
FIG. 1 is a schematic diagram of a fuel cell system according to an embodiment of the invention.

Referring now to FIG. 1, a basic layout of a fuel cell system with associated components is shown; in practice many variants are possible. A schematic representation of a fuel cell stack 10 integrated into a fuel cell system and consisting of a plurality of individual fuel cells which are connected electrically in series and/or in parallel is shown. The anode sides of all individual fuel cells of the fuel cell stack 10 are connected together in a manner commonly known in the art with the resulting anode side of the stack being designated with the reference numeral 12. In similar manner the cathode sides of all fuel cells of the stack are connected together in a manner commonly known in the art with the resulting anode side of the stack being designated with the reference numeral 14. The operations of various types of fuel cell systems are commonly known in the art; one embodiment can be found in commonly owned U.S. Pat. No. 6,849,352. Therefore, only the operation of a fuel cell system as pertinent to this invention will be explained in the description.

In the exemplary embodiment described herein, the fuel cell system includes a control system 16. The control system 16 is connected via a line 18 to a motor 20. The motor 20 is coupled with a compressor 22. The compressor 22 is in fluid communication with a cathode inlet 24 of the fuel cell stack 10 via an air supply line 26. The line 26 is a sealed passageway having known gas flow effecting characteristics such as static volume, distance, internal roughness, laminar and/or turbulent flow effects.

An air mass flow sensor 30 is disposed in the line 26 between the compressor 22 and a humidifier 28. The air mass flow sensor 30 is linked to the control system 16 via a line 32. The air mass flow sensor 30 is an electromechanical device having known gas flow effecting characteristics such as roughness, laminar and/or turbulent flow effects.

A temperature sensor 31 is connected to the line 26 between the compressor 22 and the cathode outlet 48 of the fuel cell stack 10. The temperature sensor 31 is linked to the control system 16 via a line 52. The temperature sensor 31 can be an electrical or electromechanical device having a known gas flow effecting characteristics such as roughness, laminar and/or turbulent flow effects.

The humidifier 28 is disposed in the line 26 between the air mass flow sensor 30 and the cathode inlet 24. The humidifier unit 28 is composed of a plurality of individual components all having known gas flow effecting characteristics such as roughness, laminar and/or turbulent flow effects.

Additionally, other components may be disposed in or connected to the line 26 between the air mass flow sensor 30 and the cathode inlet 24 in other embodiments.

The cathode side 14 of the fuel cell stack 10 comprises a plurality of cathodes of individual fuel cells connected in a manner commonly known in the art. Each individual fuel cell has a plurality of channels between the cathode inlet 24 and the cathode outlet 48 all having known gas flow effecting characteristics such as static volume, distance, internal roughness, laminar and/or turbulent flow effects.

A back pressure valve 29 is connected to the cathode outlet 48 of the fuel cell stack. It may also be desirable for the back pressure valve 29 to be connected to the line 26 between the compressor 22 and cathode side 14 of the fuel cell stack 10. The back pressure valve 29 is linked to the control system 16 via a line 54. The back pressure valve 29 is an electromechanical device having known gas flow effecting characteristics such as roughness, laminar and/or turbulent flow effects.

A gas pressure sensor 33 is connected to the cathode outlet 48 of the fuel cell stack 10. It may also be desirable for the gas pressure sensor 33 to be connected to the line 26 between the compressor 22 and cathode side 14 of the fuel cell stack 10. The gas pressure sensor 33 is linked to the control system 16 via a line 50. The gas pressure sensor 30 is an electromechanical device having known gas flow effecting characteristics such as roughness, laminar and/or turbulent flow effects.

An external circuit 34 is electrically linked to the cathode side 14 of the fuel cell stack 10 via a line 36 and electrically linked to the anode side 12 of the fuel cell stack 10 via a line 38. The external circuit 34 is linked to the control system 16 via a line 40.

In operation, air is pulled in via a line 42 and compressed by the compressor 22 driven by the motor 20 and is supplied via the line 26 through the cathode inlet 24 of the fuel cell stack 10 to the cathode outlet 48. The amount of time required for the air to reach the cathode inlet 24 of the fuel cell stack 10 is influenced by the gas flow effecting characteristics of the line 26 such as the static volume, distance, internal roughness, laminar and/or turbulent flow effects of the line 26. The amount of time required for the air to reach the cathode inlet 24 of the fuel cell stack 20 is also further influenced by the gas flow effecting characteristics of the components disposed in and connected to the line 26 such as roughness, laminar and/or turbulent flow effects of including but not limited to the air mass flow sensor 30, the gas temperature sensor 31, and the humidifier 28. The time required for the air to travel from the cathode inlet 24 to the cathode outlet 48 is influenced by gas flow effecting characteristics of the static volume, distance, internal roughness, laminar and/or turbulent flow effects of the plurality of channels on the cathode side 14 of the fuel cell stack 10.

The air mass flow can be measured by the air mass flow sensor 30 and communicated to the control system 16 via the line 32.

The gas temperature can be measured by the gas temperature sensor 31 and communicated to the control system 16 via the line 52.

The gas pressure is measured by the gas pressure sensor 33 and communicated to the control system 16 via the line 50.

The control system 16 can influence the speed of rotation of the air compressor 22 by controlling the motor 20 via the line 18 and thus the air mass flow delivered by the air compressor 22. The control system can further influence the position of the back pressure valve 29 via the line 54 and thus the gas pressure in the cathode side 14 of the fuel cell system. By influencing the air mass flow delivered and the gas pressure on the cathode side 14 of the fuel cell system the control system 16 can achieve a desired air mass flow and pressure in the cathode side 14 of the fuel cell system. The desired air mass flow and pressure in the cathode side 14 of the fuel cell system are calculated using known variables such as the stack current, number of cells, and desired cathode stoichiometry at that stack current.

Hydrogen gas is delivered to the anode side 12 in a manner commonly known in the art via a line 44. A reaction known per se in the art occurs between the air in the cathode side 14 and the hydrogen in the anode side 12 of the fuel cell stack 10 that releases electrons which can be drawn by the external circuit 34 via the line 38.

The pressure and air mass flow rate of the gas into the cathode side 14 of the fuel cell stack 10 influence the rate of the electron releasing reaction between the air in the cathode side 14 and the hydrogen in the anode side 12 thus influencing the voltage and current available to be drawn from the fuel cell stack 10 by the external circuit 34.

The control system 16 will calculate a feedback delay 46 (FIG. 2), taking air mass flow feedback received via the line 32, gas pressure feedback received via the line 50, gas temperature feedback received via the line 52, and the known influence of the static volume and distance of the line 26 on air flow, and the known influence on air flow of the static volume and distance of the plurality of channels between the cathode inlet 24 and the cathode outlet 48 of the fuel cell stack 10.

Furthermore, the control system may use supplemental factors in calculating the feedback delay. Additional gas flow effecting characteristics of the line 26 and the plurality of channels between the cathode inlet 24 and the cathode outlet 48 such as the internal roughness, geometry, laminar and/or turbulent flow effects on the gas can be used as factors in calculating the feedback delay. The gas flow effecting characteristics of components disposed in or connected to the line 26 such as the air mass flow sensor, gas temperature sensor, back pressure valve, and humidifier may also be used as inputs in calculating the feedback delay 46.

The feedback delay 46 is an amount of time that the control system 16 will delay the external circuit 34 from drawing current out of the fuel cell stack 10. The control system 16 can influence the external circuit 34 via the line 40 to draw current from the fuel cell stack 10 when a desired air mass flow rate is achieved after the feedback delay 46. The feedback delay calculation is in real time so that the control system instantaneously adjusts the current draw.

The feedback delay 46 is implemented in order to compensate for the distance and volume between the air mass flow sensor 30 and the cathode outlet 48 of the fuel cell stack 10 and to ensure that the desired air mass flow is actually present at the cathode outlet 48 of the fuel cell stack 10 when the external circuit 34 draws current from the fuel cell stack 10. The feedback delay 46 may also compensate for the air flow restricting characteristics of the components disposed in or connected to the line 26.

Without departing from the scope of this invention the control system 16 also, or additionally can use the gas pressure signal on the line 50 and the gas temperature signal on the line 52 as inputs in determining the delay 46. The control system 16 can further factor laminar and/or turbulent flow effects on the air mass and take into account the internal roughness of each component between the compressor 22 and the cathode outlet 48 without departing from the scope of this invention.

Figure 2:
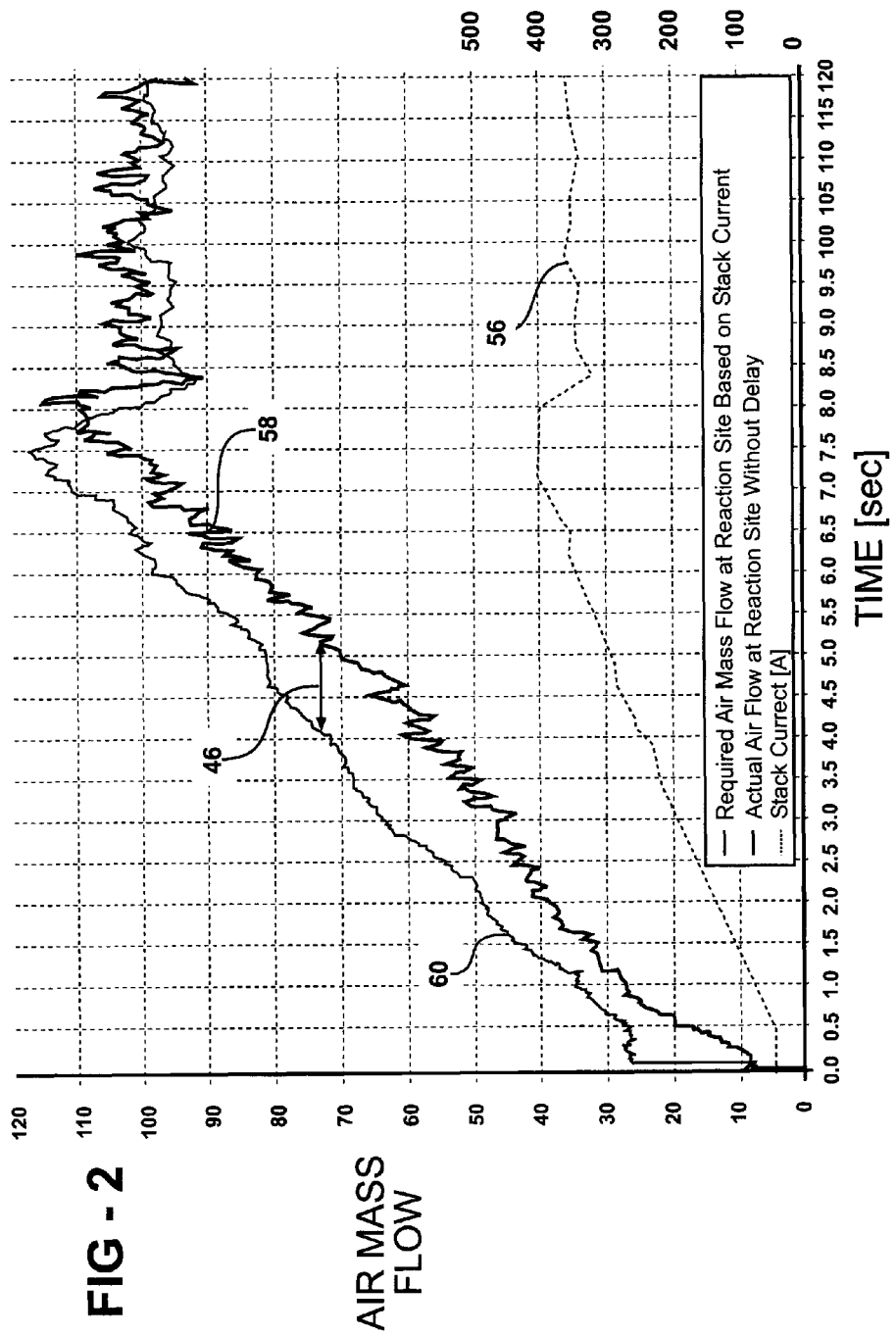
FIG. 2 is a graph with time on the x-axis and showing actual air mass flow on a cathode side of the fuel cell system illustrated in FIG. 1 compared to a required air mass flow on the cathode side based on a current drawn by an external circuit.

FIG. 2 illustrates the actual air mass flow at the cathode side 14 of the fuel cell stack 10 in comparison to the required air mass flow at the cathode side 14 based on the stack current actually being drawn by the external circuit 34. A value in amperes (y-axis) of the stack current being drawn during the up-transient versus time (x-axis) is indicated by a line 56. A value of the actual air flow at the reaction site without delay (y-axis) versus time is indicated by a line 58. A value of the required air mass flow at the reaction site based upon the stack current (y-axis) is indicated by a line 60. The delay 46 will ensure sufficient air at the cathode side 14 of the fuel cell stack 10.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for managing fuel cell power increases in a fuel cell system using air flow feedback delay, the method comprising the steps of:
   a. determining gas flow effecting characteristics of an air flow path of the fuel cell system between a compressor supplying air and a cathode outlet of a fuel cell stack by modeling a distance and a static volume of a line linking the compressor to a cathode inlet of the fuel cell stack, and a plurality of channels between the cathode inlet and the cathode outlet
   b. determining an air mass flow rate in the air flow path between the compressor and the cathode outlet;
   c. determining a gas pressure of the fuel cell system on the cathode side;
   d. calculating an air flow feedback delay as a function of said gas flow effecting characteristics, said air mass flow rate, and said gas pressure; and
   e. delaying an external circuit from drawing current out of the fuel cell stack by the magnitude of the air flow feedback delay.

2. The method according to claim 1, including performing said step a. by modeling the roughness, geometry, and laminar and/or turbulent flow effects of the line connecting the compressor to the cathode inlet, the plurality of channels between the cathode inlet and cathode outlet, and the components disposed to the line linking the compressor and cathode outlet.

3. The method according to claim 1 including performing said step a. by determining at least one of, internal roughness and laminar and/or turbulent flow effects of a line connected between the compressor and a cathode inlet of the fuel cell stack.

4. The method according to claim 1 including performing said step a. by determining at least one of static volume, distance, internal roughness and laminar and/or turbulent flow effects of a plurality of channels connected between the cathode outlet and a cathode inlet of the fuel cell stack.

5. The method according to claim 1 including performing said step a. by determining at least one of internal roughness and laminar and/or turbulent flow effects of an air mass flow sensor connected in the air flow path.

6. The method according to claim 1 including performing said step a. by determining at least one of internal roughness and laminar and/or turbulent flow effects of a back pressure valve connected in the air flow path.

7. The method according to claim 1 including performing said step a. by determining at least one of internal roughness and laminar and/or turbulent flow effects of a gas pressure sensor connected in the air flow path.

8. The method according to claim 1 including performing said step a. by determining at least one of internal roughness and laminar and/or turbulent flow effects of a temperature sensor connected in the air flow path.

9. The method according to claim 1 including performing said step a, by determining at least one of internal roughness and laminar and/or turbulent flow effects of a humidifier connected in the air flow path.

10. The method according to claim 1 including performing said step b. with an air mass flow sensor connected in the air flow path.

11. The method according to claim 10 including performing said step d. by calculating the air flow feedback delay as a function of the actual air mass flow, gas temperature, gas pressure and a static volume of a cathode of the fuel cell stack.

* * * * *